United States Patent
Yang et al.

(10) Patent No.: US 8,649,279 B2
(45) Date of Patent: Feb. 11, 2014

(54) APPARATUS AND METHOD FOR ADAPTIVE TSP SETTING TO MINIMIZE DUPLICATE PACKET TRANSMISSIONS

(75) Inventors: Ming Yang, San Diego, CA (US);
Manish Tripathi, San Diego, CA (US);
Mukesh K. Mittal, San Diego, CA (US);
Mustafa Saglam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 302 days.

(21) Appl. No.: 12/625,419

(22) Filed: Nov. 24, 2009

(65) Prior Publication Data
US 2010/0303054 A1 Dec. 2, 2010

Related U.S. Application Data

(60) Provisional application No. 61/117,442, filed on Nov. 24, 2008.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 4/00* (2009.01)
*H04J 3/00* (2006.01)

(52) U.S. Cl.
USPC ............ 370/252; 370/229; 370/328; 370/345

(58) Field of Classification Search
None
See application file for complete search history.

(56) References Cited

U.S. PATENT DOCUMENTS 8,422,480 B2 4/2013 Ho
2006/0013257 A1 1/2006 Vayanos
(Continued)

FOREIGN PATENT DOCUMENTS

CN 101809923 A 8/2010
EP 1161022 A1 12/2001
(Continued)

OTHER PUBLICATIONS

3GPP Draft; R2-002032, 3rd Generation Partnership Project (3GPP), Mobile Competence Centre, "Clarification to the Estimated EPC Counter," Oct. 16, 2000.
International Search Report and Written Opinion—PCT/US2009/065809, International Search Authority—European Patent Office Jul. 16, 2010.

(Continued)

*Primary Examiner* — Faruk Hamza
*Assistant Examiner* — Diane Lo
(74) *Attorney, Agent, or Firm* — Abdollah Katbab

(57) ABSTRACT

An apparatus and method for adaptively setting a Timer_Status_Prohibit (TSP) parameter, the method comprising receiving a category information from a first terminal; determining a threshold value based on the category information and transmitting the threshold value to the first terminal; starting a TSP timer and transmitting at least one data packet to the first terminal once the TSP timer has started; determining when the TSP timer exceeds the threshold value to discontinue transmitting the at least one data packet to the first terminal; receiving a status report from the first terminal; and using the status report, determining whether there is any missing or erroneously received data packet and retransmitting any missing or erroneously received data packet from the at least one data packet to the first terminal.

20 Claims, 11 Drawing Sheets

(56) References Cited

U.S. PATENT DOCUMENTS

| | | | |
|---|---|---|---|
| 2008/0046132 A1* | 2/2008 | Dalsgaard et al. | 700/299 |
| 2008/0268785 A1 | 10/2008 | McCoy et al. | |
| 2010/0054139 A1* | 3/2010 | Chun et al. | 370/252 |

FOREIGN PATENT DOCUMENTS

| | | |
|---|---|---|
| JP | 2008536381 A | 9/2008 |
| WO | WO0249372 | 6/2002 |
| WO | WO2006104341 | 10/2006 |

OTHER PUBLICATIONS

LG Electronics Inc: "Enhancement of RLC" 3GPP Draft; R2-052512 Enhancement of RLC, 3rd Generation Partnership Project (3GPP), Mobile Competence Centre ; 650, Route Des Lucioles ; F-06921 Sophia-Antipolis Cedex ; France, vol. RAN WG2, No. Cannes, France; 2.

Partial International Search Report—PCT/US2009/065809—International Search Authority—European Patent Office, May 11, 2010.

European Search Report—EP12186345—Search Authority—Hague—Oct. 24, 2012.

* cited by examiner

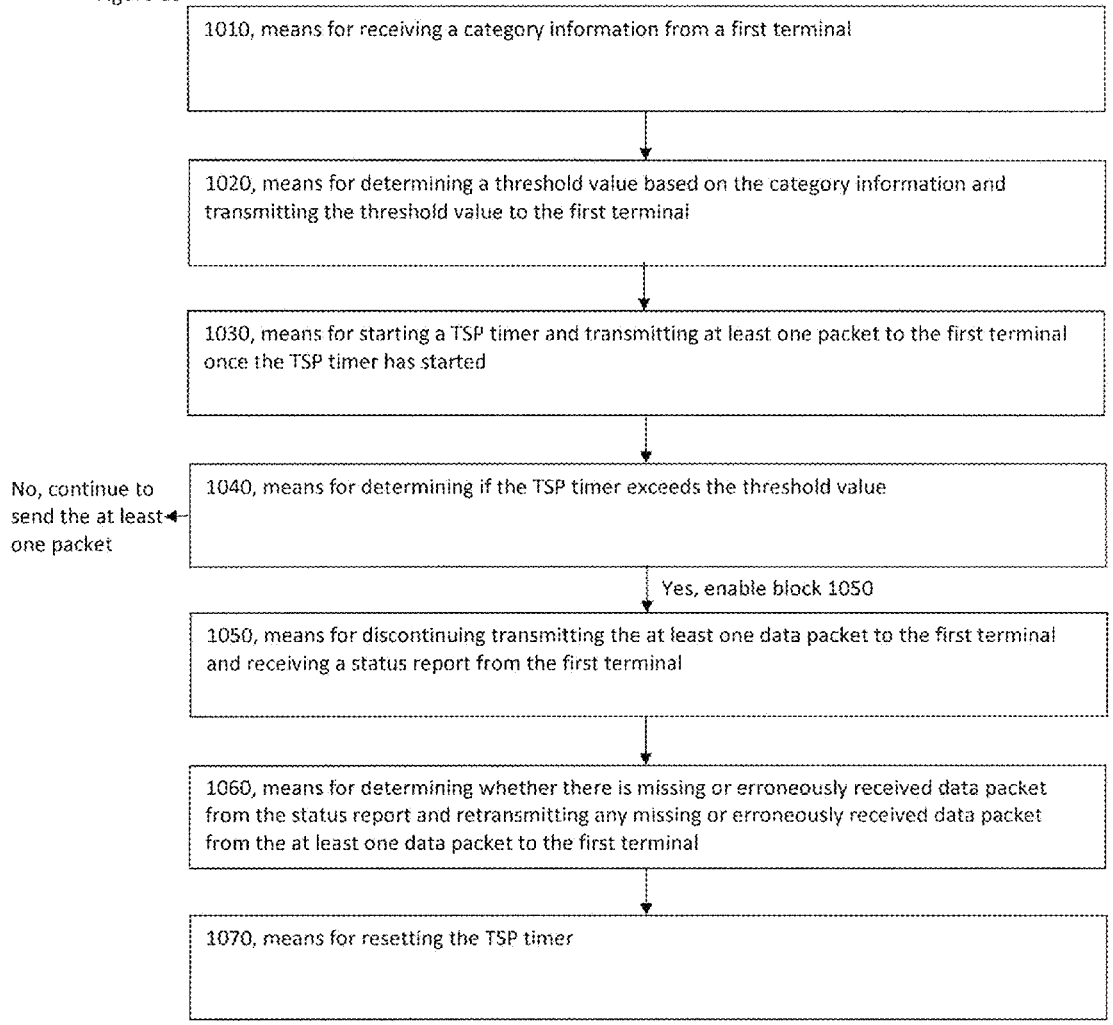

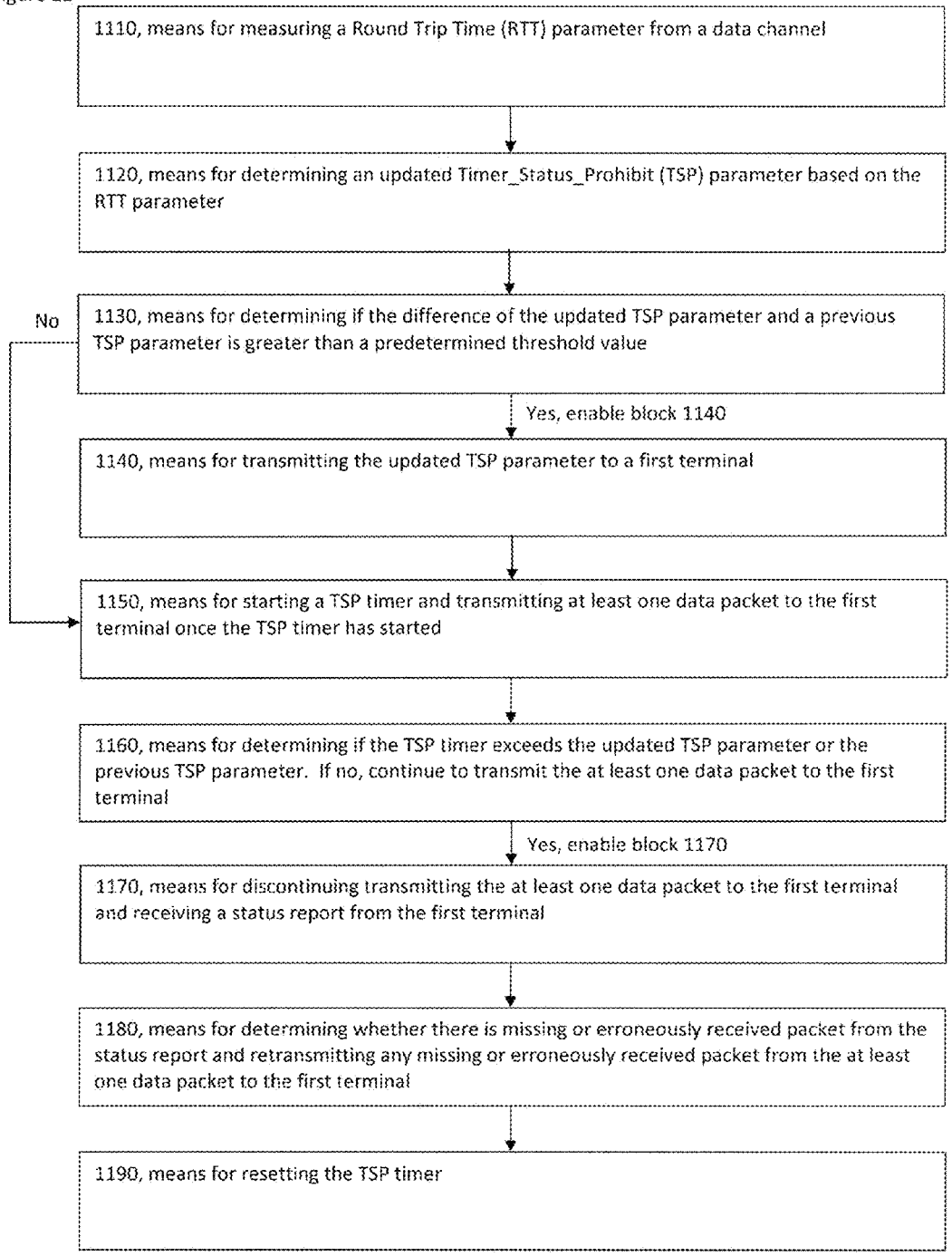

APPARATUS AND METHOD FOR ADAPTIVE TSP SETTING TO MINIMIZE DUPLICATE PACKET TRANSMISSIONS

CLAIM OF PRIORITY UNDER 35 U.S.C. §119

The present application for patent claims priority to Provisional Application No. 61/117,442, entitled "Methods and Apparatus for Adaptive TSP Setting to Minimize Duplicate Packages Transmission" filed Nov. 24, 2008, and assigned to the assignee hereof and hereby expressly incorporated by reference herein.

FIELD

This disclosure relates generally to apparatus and methods for setting a time parameter for acknowledgement messages in a wireless communication system. More particularly, the disclosure relates to adaptively setting a Timer_Status_Prohibit (TSP) parameter, for example, in UMTS, HSPDA, LTE, etc., for minimizing duplicate packet transmission.

BACKGROUND

In many telecommunication systems, communications networks are used to exchange messages among several interacting spatially-separated devices. The various types of networks may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for transmission (e.g. wired vs. wireless), or in the set of communication protocols used (e.g. Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a static form of communications networks and are typically favored for interconnection of fixed network elements or for bulk data transfer. For example, fiber optic cables are often the preferred transmission media for very high throughput transport applications over long distances between large network hubs, such as, bulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

In one example, wireless networks are compatible with various wireless protocols. Exemplary versions of wireless protocols include Universal Mobile Telecommunications System (UMTS), High Speed Downlink Packet Access (HSDPA), High Speed Uplink Packet Access (HSUPA), Long Term Evolution (LTE), etc. Wireless systems compliant with these protocols are used for various communication services such as telephony, messaging, data transfer, emails, Internet access, audio broadcasts, video communications, etc. These wireless systems generally utilize an access node (AN), also known as base station (BS) or Node B, to connect to an individual access terminal (AT), also known as user equipment (UE) or user device, to fixed telecommunications infrastructure networks. In general, a radio coverage area is implemented using a plurality of Node Bs using a cellular-based topological architecture to provide wireless access, also known as an air interface, to the UEs (e.g., user devices). Examples of fixed telecommunications infrastructure networks include the public switched telephony network (PSTN), Internet, private data networks, etc. In one aspect, the Node Bs may be connected to a Radio Network Controller (RNC) to facilitate the interconnection to the fixed telecommunications infrastructure networks.

SUMMARY

Disclosed is an apparatus and method for adaptively setting a Timer_Status_Prohibit (TSP) parameter in wireless systems to minimize duplicate packet transmissions. According to one aspect, an apparatus and method for adaptively setting a Timer_Status_Prohibit (TSP) parameter, the method comprising receiving a category information from a first terminal; determining a threshold value based on the category information and transmitting the threshold value to the first terminal; starting a TSP timer and transmitting at least one data packet to the first terminal once the TSP timer has started; determining when the TSP timer exceeds the threshold value to discontinue transmitting the at least one data packet to the first terminal; receiving a status report from the first terminal; and using the status report, determining whether there is any missing or erroneously received data packet and retransmitting any missing or erroneously received data packet from the at least one data packet to the first terminal.

According to another aspect, an apparatus and method for adaptively setting a Timer_Status_Prohibit (TSP) parameter, the method comprising measuring a Round Trip Time (RTT) parameter from a data channel; determining an updated Timer_Status_Prohibit (TSP) parameter based on the RTT parameter; starting a TSP timer and transmitting at least one data packet to a first terminal once the TSP timer has started; determining when the TSP timer exceeds the updated TSP parameter or a previous TSP parameter and discontinuing transmitting the at least one data packet when the TSP timer exceeds the updated TSP parameter or the previous TSP parameter; and receiving a status report from the first terminal and determining whether there is missing or erroneously received data packet based on the status report.

Advantages of the present disclosure include minimizing duplicate packet transmissions, improving throughput, reducing latency and/or bringing better user perceived quality for the service provided by wireless systems based on.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIG. 10 illustrates an example of a device suitable for adaptively setting a Timer_Status_Prohibit (TSP) parameter.

FIG. 11 illustrates a second example of a device suitable for adaptively setting a Timer_Status_Prohibit (TSP) parameter.

DETAILED DESCRIPTION

Figure 1:
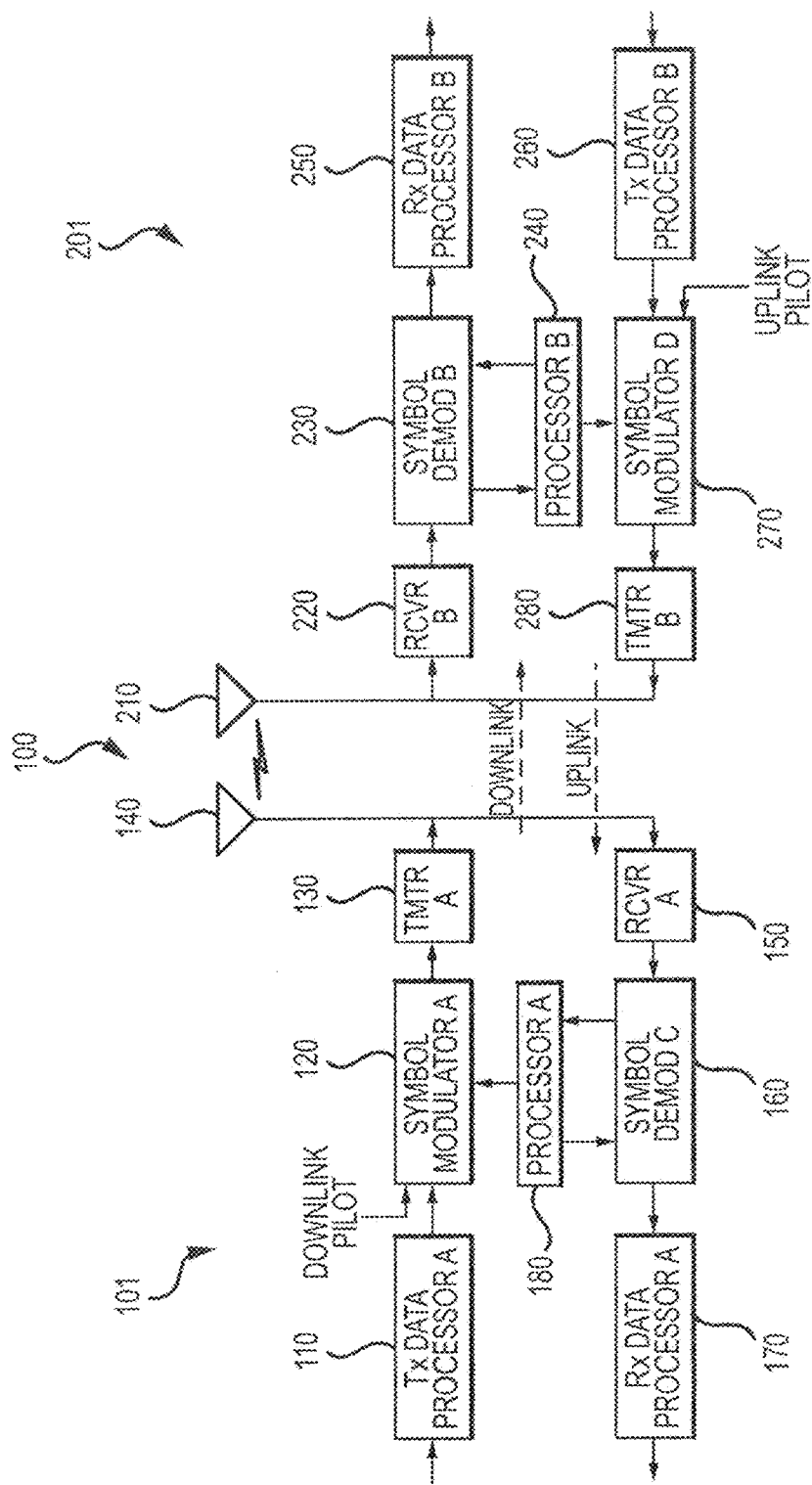
FIG. 1 is a block diagram illustrating an example of a two terminal system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

FIG. 1 is a block diagram illustrating an example of a two terminal system 100. One skilled in the art would understand that the example two terminal system 100 illustrated in FIG. 1 may be implemented in an FDMA environment, an OFDMA environment, a CDMA environment, a WCDMA environment, a TDMA environment, a SDMA environment or any other suitable wireless environment.

In one aspect, the two terminal system 100 includes an access node 101 (e.g., base station or Node B) and a user equipment or UE 201 (e.g., user device). In the downlink leg, the access node 101 (e.g., base station or Node B) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 (e.g., user device) includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 (e.g., user device) includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 (e.g., user device) is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station or Node B) and at the UE 201 (e.g., user device), respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the two terminal system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs (e.g., user devices). In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
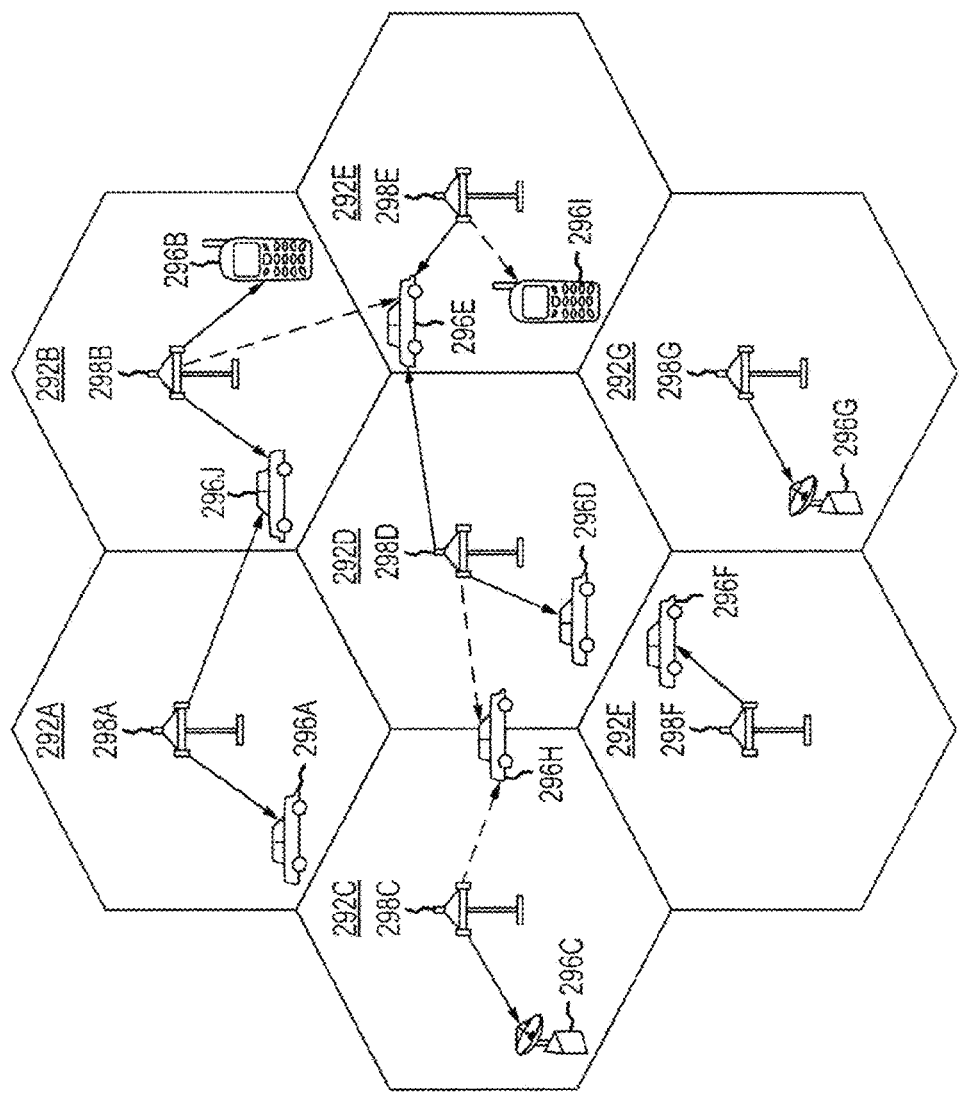
FIG. 2 illustrates an example of a wireless communications system that supports a plurality of user devices.

FIG. 2 illustrates an example of a wireless communications system 290 that supports a plurality of user devices. In FIG. 2, reference numerals 292A to 292G refer to cells, reference numerals 298A to 298G refer to base stations (BS) or node Bs and reference numerals 296A to 296J refer to access user devices (a.k.a. user equipments (UE)). Cell size may vary. Any of a variety of algorithms and methods may be used to schedule transmissions in system 290. System 290 provides communication for a number of cells 292A through 292G, each of which is serviced by a corresponding base station 298A through 298G, respectively.

In one aspect, a wireless communications system (e.g. UMTS, HSDPA, LTE, etc.) is represented by a network protocol layer model. For example, the lowest two protocol layers, physical (PHY) layer and medium access control (MAC) layer, are responsible for basic point-to-point data transfer between two participating communication terminals. In addition, the Radio Link Control (RLC) layer provides a reliable link between the two terminals, for example, between a Node B and a user device. In one aspect, there are three transmission modes in the RLC layer: transparent mode (TM), unacknowledged mode (UM), and acknowledged mode (AM). In acknowledged mode, one terminal, e.g. user device, sends STATUS reports to another terminal, e.g. Node B, for data flow control. In one example, the data flow control is used for error recovery by sending acknowledgment (ACK) signals when transmission is successful and by sending negative acknowledgement (NAK) signals when transmission is unsuccessful in the status reports. Through this transmission mechanism, the sequence of successfully received and missing or erroneously received data packets (a.k.a. packages) are fed back to the sender for subsequent error recovery through retransmission of the missing or erroneously received data packets. In one example, an automatic repeat/request (ARQ) protocol is used for error recovery.

In one example, the wireless communication system, e.g. UMTS/HSPDA, LTE, etc., desires to regulate the number of consecutive acknowledgment STATUS reports sent over a period of time. For example, a timer denoted as Timer_Status Prohibit (TSP) is defined in 3GPP TS (Technical Specification) 25.322 section 9.5 & TS (Technical Specification) 25.331 section 10.3.4.1, as the minimum time between consecutive STATUS reports that request the transmitter to re-transmit a missing or erroneously received packet (a.k.a. package) detected by the receiver. In one aspect, a packet is a discrete data block sent from the transmitter to the receiver. In one example, the PDUs (Protocol Data Units) or packets are lost in the air interface, which may not be recovered by HS (high speed) physical layer re-transmission. In another example, the PDUs or packets are also lost in the transport network between Node B and RNC or in the internal buffers of Node B or RNC in case of network congestion. In one example, the HS physical layer may not attempt to recover these missing PDUs. In another example, for 3GPP Release 1999 (R99) devices, HS physical layer re-transmission may not be applied. (R99 refers to the first release of the 3GPP specifications for Universal Terrestrial Radio Access (UTRA).)

Figure 3:
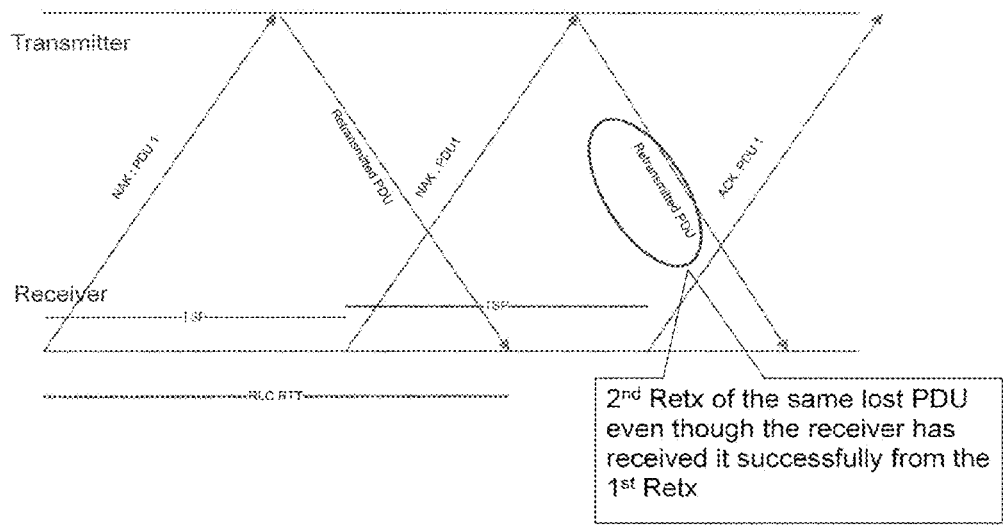
FIG. 3 illustrates an example of a transmission sequence between two terminals, for example, a transmitter and a receiver.

FIG. 3 illustrates an example of a transmission sequence between two terminals, for example, a transmitter and a receiver. In another example, if the Timer_Status_Prohibit (TSP) is set to less than a Round Trip Time (RTT) parameter, the missing PDUs cause a negative acknowledgement (NAK) signal to be sent more than once, resulting in duplicate packets received by the receiver, as shown in FIG. 3. In one aspect, the RTT parameter is the time delay due to two-way radio propagation between two terminals. One skilled in the art would understand that in the example of the two terminals being a transmitter and a receiver, the transmitter includes the ability to receive signals (e.g., packets) and the receiver includes the ability to transmit signals (e.g., packets)

Duplication of packets waste wireless resources, such as air interface capacity, transport network resources and transmitter/receiver processing resources, etc. Duplicate packets may also cause a loss in throughput performance. In one example, for optimum performance of a 3GPP R99 device, TSP may be set to RTT+1 to 2 TTIs, such as 120 ms. Setting TSP to less than RTT means that all packets may be re-transmitted twice or more, resulting in a significant loss in throughput. In one aspect, TTI is a transmission time interval equivalent to the time to transport data blocks over a radio interface.

For optimum performance of wireless communication technologies, such as HSDPA devices, TSP may be set to a low value, for example, 80 ms. In one example, this TSP setting allows the Radio Link Control (RLC) transmit window to move fast enough and hence ensure higher throughput achievable by the advanced High Speed Downlink Packet Access (HSDPA) category 6 and 8 devices.

Currently there are different types of R99 DCH (dedicated channel), HSDPA user devices, which have quite different Round Trip Time (RTT) parameters. In one example, using a global TSP setting may not be optimal for all existing user devices.

In another example, the RTT parameter changes with changing network load or other factors. For example, if the user device transits from HS to R99 DCH (dedicated channel), using the same TSP setting for all time is not an optimal setting.

Currently, a global TSP setting for all time is used for various types of user devices, which results in duplicate packets received for certain type devices. This approach wastes wireless network resources and results in throughput loss.

In one aspect, different user devices have different capabilities, which results in different RTTs. The user device category or capability is defined by 3GPP TS 25.331. In one example, user devices may inform (e.g., broadcast) their category or capability during the initial signaling channel establishment.

In one example, a transmitter receives the category information of a user device (e.g., a receiver) through a signaling channel and assigns different TSP settings for different category of user devices. In this example, the transmitter can be considered part of a two terminal system with a receiver as the other terminal. One skilled in the art would understand that the transmitter can include the ability to receive signals (e.g., packets) and the receiver can include the ability to transmit signals (e.g., packets).

Figure 4:
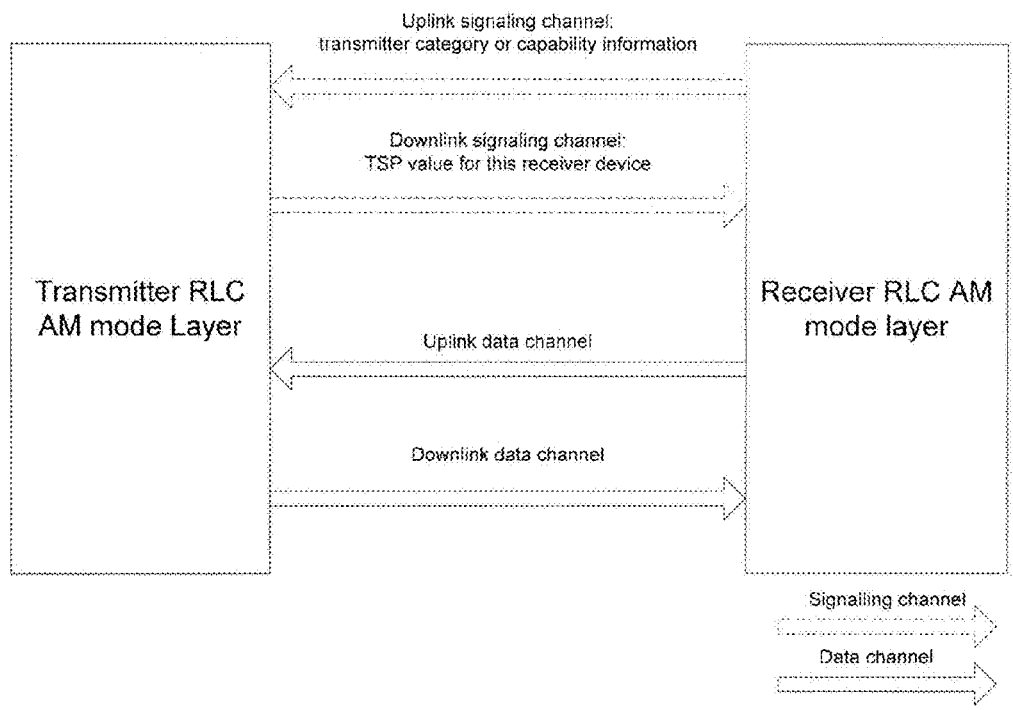
FIG. 4 illustrates an example of a signaling and data channel exchange between two terminals (for example, a transmitter and a receiver) at a Radio Link Control (RLC) protocol layer.

FIG. 4 illustrates an example of a signaling and data channel exchange between two terminals (for example, a transmitter and a receiver) at a Radio Link Control (RLC) protocol layer. In FIG. 4, the two terminal system obtains better throughput performance for all existing user devices. In FIG. 4, the RLC layer in Acknowledged Mode (AM) between the transmitter and receiver is illustrated with both signaling and data channels. In one aspect, an Uplink signaling channel from the receiver sends a transmitter category or capability information to the transmitter. A downlink signaling channel from the transmitter sends a TSP value to the receiver. In addition, an uplink data channel and a downlink data channel are provided for general traffic purposes between the transmitter and the receiver.

Figure 5:
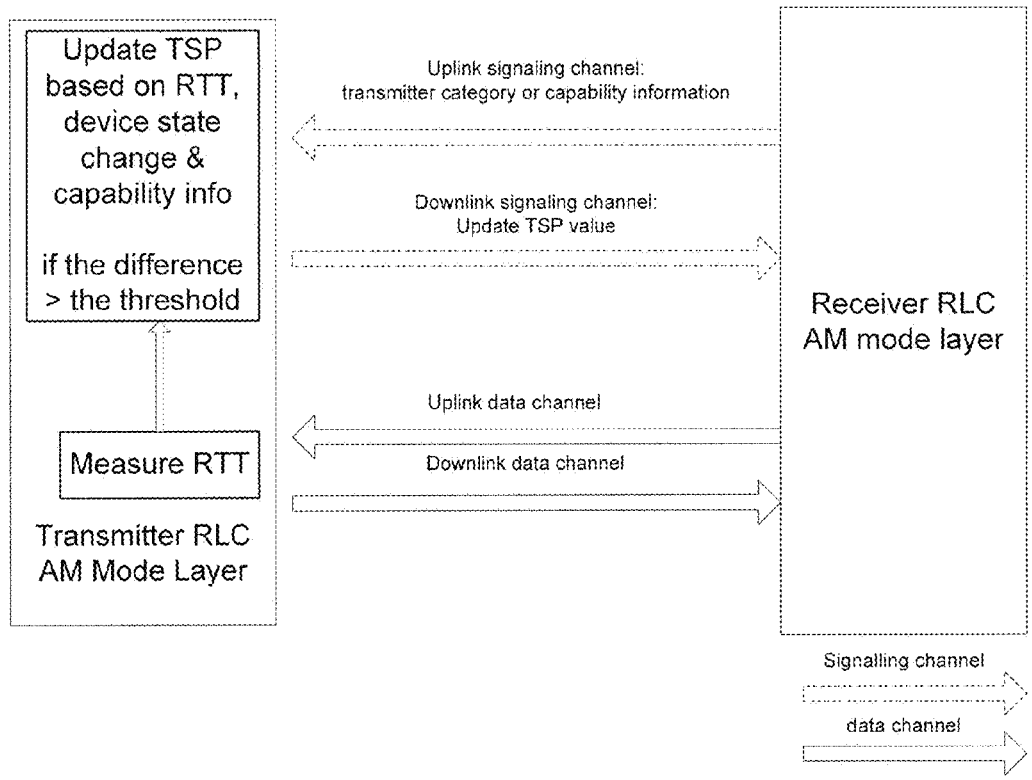
FIG. 5 illustrates a second example of a signaling and data channel exchange between two terminals (for example, a transmitter and a receiver) at a Radio Link Control (RLC) protocol layer.

FIG. 5 illustrates a second example of a signaling and data channel exchange between two terminals (for example, a transmitter and a receiver) at a Radio Link Control (RLC) protocol layer. In one aspect, RTT also changes with network load or other changing factors. Accordingly, the transmitter measures RTT from a data channel, e.g. uplink data channel or downlink data channel, and determines an updated TSP setting. In one aspect, the updated TSP setting is recognized as an optimal TSP setting based on the RTT. If the difference between the updated TSP value and a previous TSP value, which previously was announced (e.g., broadcast), is above a pre-defined threshold, the transmitter informs the receiver of the updated TSP value to minimize the duplicate packages, as illustrated in FIG. 5. One skilled in the art would understand that the pre-defined threshold may be based on many factors associated with an application, a protocol standard, operator and user consideration or design choice without affecting the scope or spirit of the present disclosure.

The algorithms disclosed herein minimizes duplicate packet transmission, which results in improved throughput and reduced latency and brings better user perceived quality for the service provided by wireless systems based on, for example, UMTS/HSPA technology. In another aspect, the present disclosure may not only limited to 3GPP technologies such as UMTS/HSPA, but can also be extended to other wireless technologies, such as LTE (Long Term Evolution) and WiMAX (Worldwide Interoperability for Microwave Access), etc. One skilled in the art would understand that the technologies are mentioned herein are not exclusive examples and that the present disclosure is also applicable to other wireless system technologies not mentioned herein.

Figure 6:
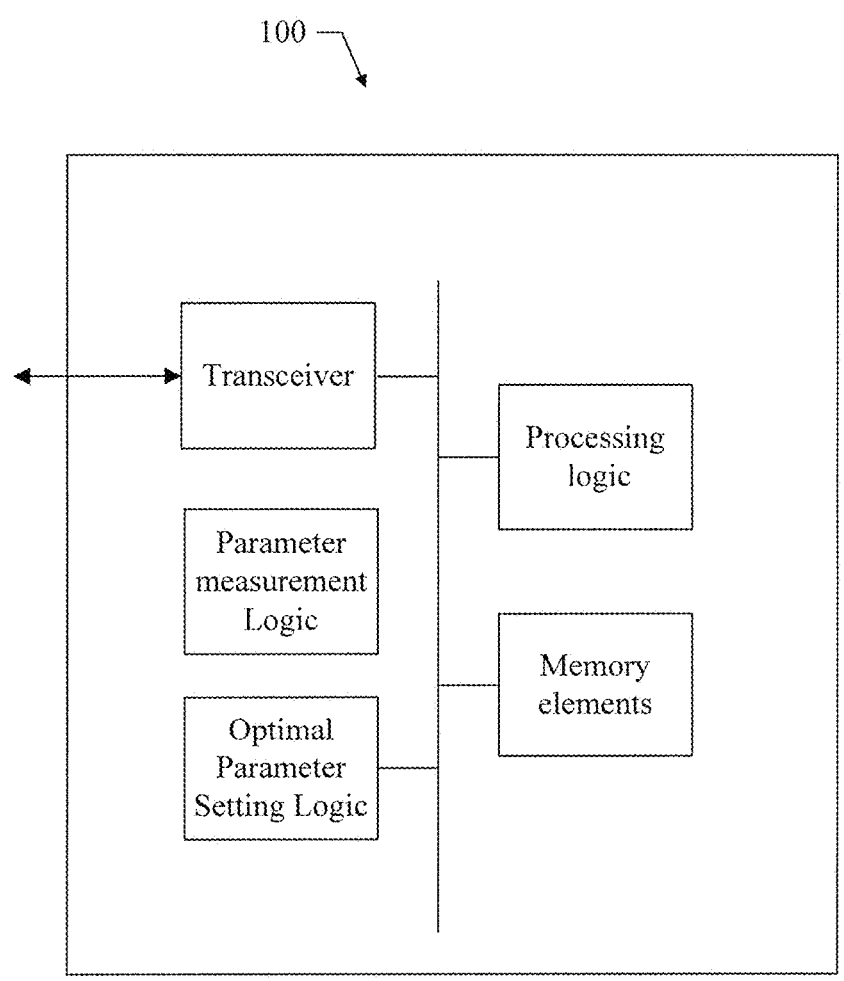
FIG. 6 illustrates an example of a user device for adaptive parameter setting according to the present disclosure.

In one aspect, the present disclosure may not only be applied to setting an updated TSP, but may also be extended to other parameters, such as Timer Poll, RLD PDU size, etc., related to Round Trip Time (RTT) parameter and device category. FIG. 6 illustrates an example of a user device for adaptive parameter setting according to the present disclosure.

Figure 7:
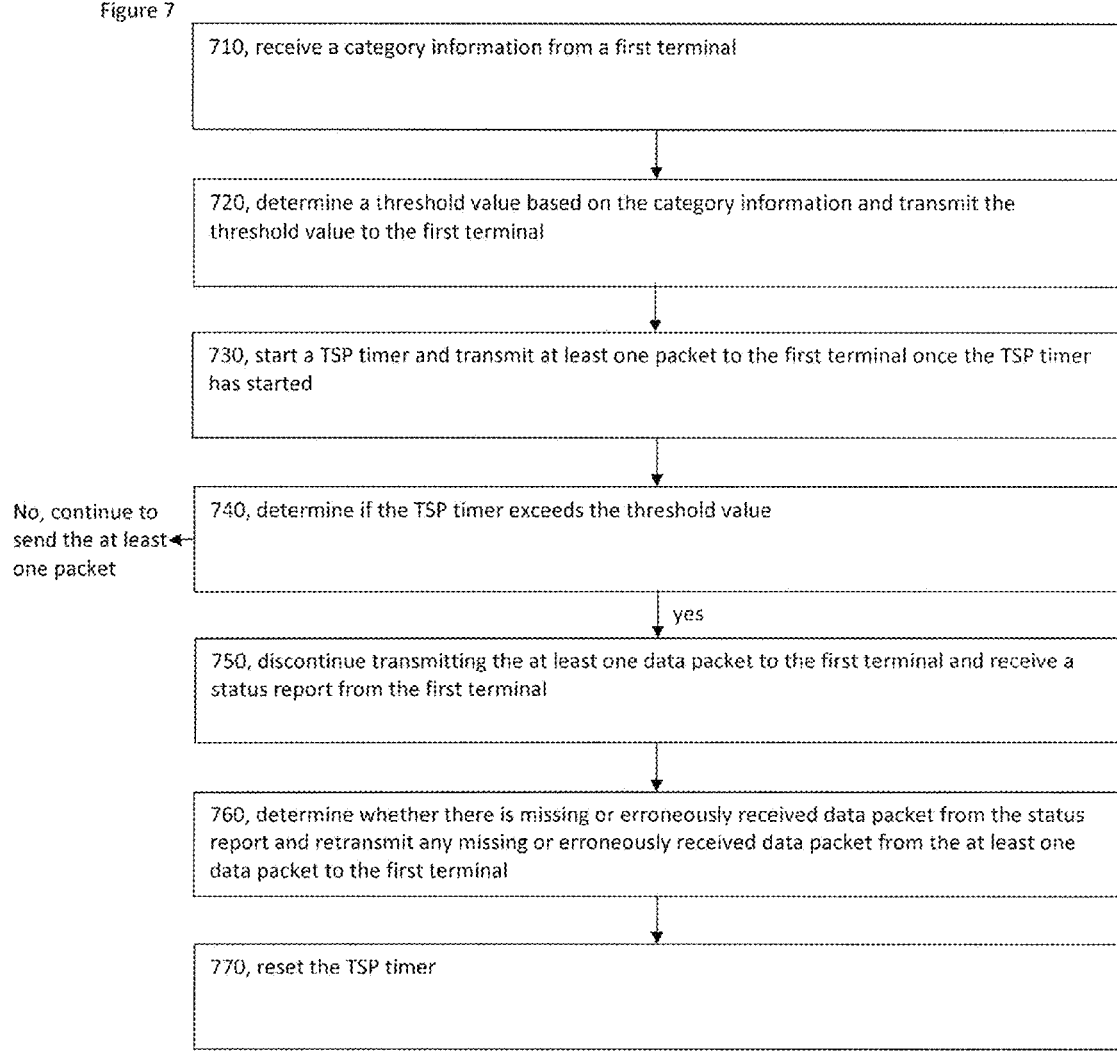
FIG. 7 illustrates a first exemplary flow diagram for adaptively setting a Timer_Status_Prohibit (TSP) parameter.

FIG. 7 illustrates a first exemplary flow diagram for adaptively setting a Timer_Status_Prohibit (TSP) parameter. In block 710, receive a category information from a first terminal. In one aspect, the first terminal is in an acknowledged mode. In one example, the category information is received on an uplink signaling channel. Following block 710, in block 720, determine a threshold value based on the category information and transmit the threshold value to the first terminal. For example, the threshold value can be transmitted on a downlink signaling channel. In one example, the threshold value is a Timer_Status_Prohibit (TSP) parameter. Following block 720, in block 730, start a TSP timer and transmit at least one data packet to the first terminal once the TSP timer has started. In one example, the at least one data packet is transmitted on a downlink data channel.

Following block 730, in block 740, determine if the TSP timer exceeds the threshold value. If the TSP timer has not exceeded the threshold value, continue to transmit the at least one data packet to the first terminal. If the TSP timer has exceeded the threshold value, then in block 750, discontinue transmitting the at least one data packet to the first terminal and receive a status report from the first terminal. Following block 750, in block 760, determine whether there is a missing or an erroneously received data packet from the status report and retransmit any missing or erroneously received data packet from the at least one data packet to the first terminal. Following block 760, in block 770, reset the TSP timer. In one example, the TSP timer is set to zero as an indicated starting point.

Figure 8:
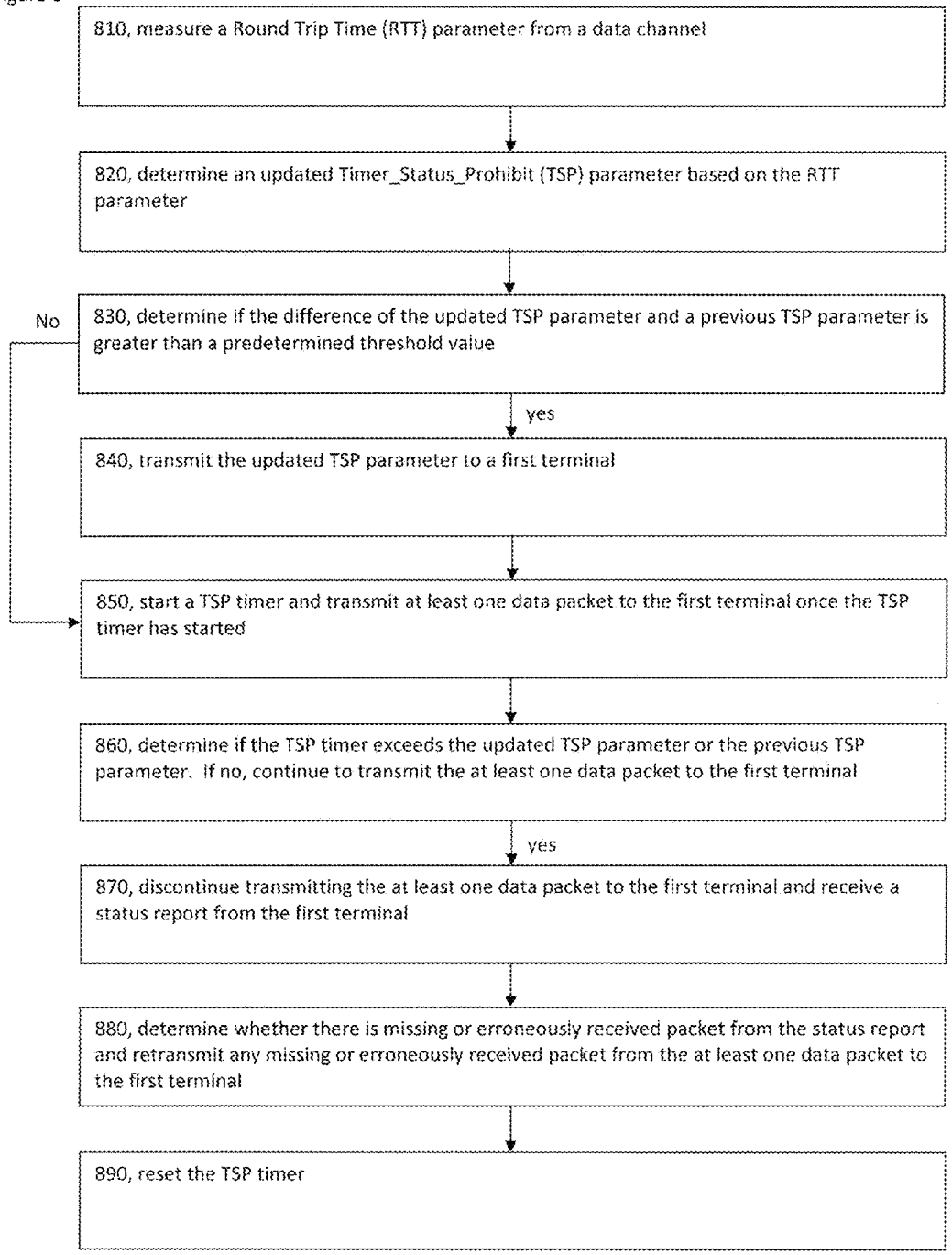
FIG. 8 illustrates a second exemplary flow diagram for adaptively setting a Timer_Status_Prohibit (TSP) parameter.

FIG. 8 illustrates a second exemplary flow diagram for adaptively setting a Timer_Status_Prohibit (TSP) parameter. In block 810, measure a Round Trip Time (RTT) parameter from a data channel. In one example, the data channel is the downlink data channel. Following block 810, in block 820, determine an updated Timer_Status_Prohibit (TSP) parameter based on the RTT parameter. In one example, the updated TSP parameter is regarded as an updated TSP parameter given the RTT parameter. Following block 820, in block 830, determine if the difference of the updated TSP parameter and a previous TSP parameter is less than a predetermined threshold.

If yes (i.e., the difference of the updated TSP parameter and a previous TSP parameter is greater than a predetermined threshold), then in block 840, transmit the updated TSP parameter to a first terminal. In one example, the TSP parameter is transmitted on a downlink signaling channel. Following block 840, proceed to block 850. If no (i.e., the difference of the updated TSP parameter and a previous TSP parameter is not greater than a predetermined threshold), then in block 850, start a TSP timer and transmit at least one data packet to the first terminal once the TSP timer has started. In one example, the at least one data packet is transmitted on a downlink data channel.

Following block 850, in block 860, determine if the TSP timer exceeds the updated TSP parameter or the previous TSP parameter. If the TSP timer has not exceeded the updated or previous TSP parameter, continue to transmit the at least one data packet to the first terminal. If the TSP timer has exceeded the updated ore previous TSP parameter, then in block 870, discontinue transmitting the at least one data packet to the first terminal and receive a status report from the first terminal. Following block 870, in block 880, determine whether there is a missing or an erroneously received data packet from the status report and retransmit any missing or erroneously received data packet from the at least one data packet to the first terminal. Following block 880, in block 890, reset the TSP timer. In one example, the TSP timer is set to zero as an indicated starting point.

One skilled in the art would understand that the steps disclosed in the example flow diagrams in FIGS. 7 & 8 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 9:
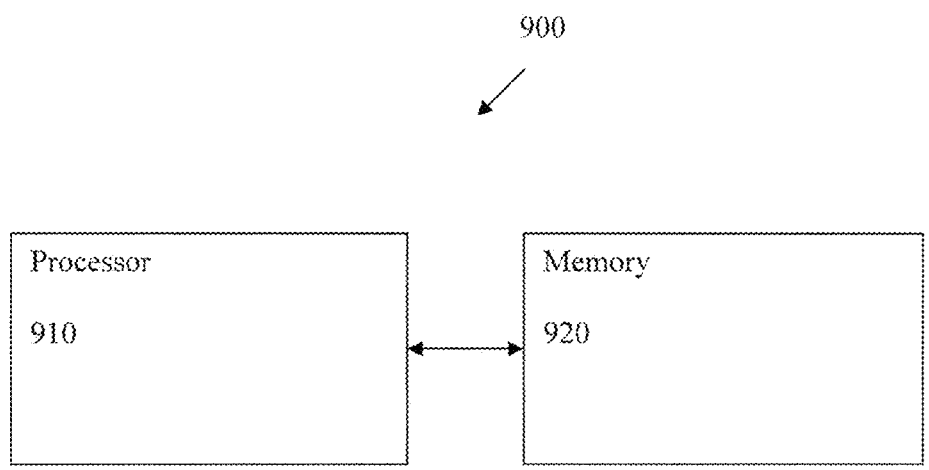
FIG. 9 illustrates an example of a device comprising a processor in communication with a memory for executing the processes described in the flow diagrams of FIGS. 7 and 8.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 9 illustrates an example of a device 900 comprising a processor 910 in communication with a memory 920 for executing the processes described in the flow diagrams of FIGS. 7 and 8. In one example, the device 900 is used to implement the algorithms illustrated in FIGS. 7 and 8. In one aspect, the memory 920 is located within the processor 910. In another aspect, the memory 920 is external to the processor 910. In one aspect, the processor includes circuitry for implementing or performing the various flow diagrams, logical blocks and/or modules described herein.

FIG. 10 illustrates an example of a device 1000 suitable for adaptively setting a Timer_Status_Prohibit (TSP) parameter. In one aspect, the device 1000 is implemented by at least one processor comprising one or more modules configured to provide different aspects of adaptively setting a Timer_Status_Prohibit (TSP) parameter as described herein in blocks 1010, 1020, 1030, 1040, 1050, 1060 and 1070. For example, each module comprises hardware, firmware, software, or any combination thereof. In one aspect, the device 1000 is also implemented by at least one memory in communication with the at least one processor.

FIG. 11 illustrates a second example of a device 1100 suitable for adaptively setting a Timer_Status_Prohibit (TSP) parameter. In one aspect, the device 1000 is implemented by at least one processor comprising one or more modules configured to provide different aspects of adaptively setting a Timer_Status_Prohibit (TSP) parameter as described herein in blocks 1110, 1120, 1130, 1140, 1150, 1160, 1170, 1180 and 1190. For example, each module comprises hardware, firmware, software, or any combination thereof. In one aspect, the device 1100 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for adaptively setting a Timer_Status_Prohibit (TSP) parameter, the method comprising:
   receiving user device category information from a first terminal, the user device category information indicating a type of user device from among different types of user device;
   determining a Timer Status Prohibit (TSP) parameter based on the user device category information;
   transmitting the TSP parameter to the first terminal;
   transmitting at least one data packet to the first terminal;
   receiving a status report from the first terminal, the status report transmitted from the first terminal at a time based at least in part on the TSP parameter;
   using the status report, determining whether there is any missing or erroneously received data packet out of the at least one data packet;
   retransmitting any missing or erroneously received data packet to the first terminal;
   measuring a Round Trip Time (RTT) parameter from a data channel;
   determining an updated Timer Status Prohibit (TSP) parameter based on the RTT parameter;
   determining whether to transmit the updated TSP parameter based on a comparison of the value of a difference between the updated TSP parameter and the TSP parameter to a predetermined threshold value; and
   transmitting the updated TSP parameter to the first terminal based at least in part on the determination that the difference value is greater than the predetermined threshold value.

2. The method of claim 1, wherein the user device category information is received on an uplink signal channel.

3. The method of claim 2, wherein the TSP parameter is transmitted on a downlink signaling channel.

4. The method of claim 3, wherein the at least one data packet is transmitted on a downlink data channel.

5. The method of claim 1, wherein the first terminal is in an acknowledged mode.

6. A method for adaptively setting a Timer Status Prohibit (TSP) parameter, the method comprising:
   measuring a Round Trip Time (RTT) parameter from a data channel;
   determining an updated (TSP) parameter based on the RTT parameter and user device category information;
   determining whether to transmit the updated TSP parameter based on a comparison of the value of a difference between the updated TSP parameter and the TSP parameter to a predetermined threshold value;
   transmitting the updated TSP parameter based at least in part on the determination that the difference value is greater than the predetermined threshold value;
   transmitting at least one data packet to a first terminal; and
   receiving a status report from the first terminal, the status report transmitted from the first terminal at a time based at least in part on the updated TSP parameter; and
   determining whether there is any missing or erroneously received data packet based on the status report.

7. The method of claim 6, further comprising retransmitting to the first terminal any missing or erroneously received data packet out of the at least one data packet.

8. The method of claim 6, further comprising transmitting the updated TSP parameter to the first terminal if the difference value between the updated TSP parameter and the TSP parameter is greater than the predetermined threshold value.

9. The method of claim 6, wherein the data channel is the downlink data channel.

10. The method of claim 6, wherein the at least one data packet is transmitted on a downlink data channel.

11. An apparatus configured to set a Timer Status Prohibit (TSP) parameter, comprising:
   means for receiving user device category information from a first terminal, the user device category information indicating a type of user device from among different types of user device;
   means for determining a Timer Status Prohibit (TSP) parameter based on the user device category information;
   means for transmitting the TSP parameter to the first terminal;
   means for measuring a Round Trip Time (RTT) parameter from a data channel;
   means for determining an updated TSP parameter based on the RTT parameter;
   means for determining whether to transmit the TSP parameter or the updated TSP parameter based on a comparison of the value of a difference between the updated TSP parameter and the TSP parameter to a predetermined threshold value; and
   means for transmitting the updated TSP parameter to the first terminal based at least in part on the determination that the difference value is greater than the predetermined threshold value.

12. The apparatus of claim 11, wherein the user device category information is received on an uplink signal channel.

13. The apparatus of claim 11, wherein the TSP parameter is transmitted on a downlink signaling channel.

14. A computer program product, comprising:
   a non-transitory computer-readable medium comprising:
   code for causing a computer to receive user device category information from a first terminal, the user device category information indicating a type of user device from among different types of user device;
   code for causing the computer to determine a Timer Status Prohibit (TSP) parameter based on the user device category information;
   code for causing the computer to transmit the TSP parameter to the first terminal;
   code for causing the computer to measure a Round Trip Time (RTT) parameter from a data channel;
   code for causing the computer to determine an updated Timer Status Prohibit (TSP) parameter based on the RTT parameter;
   code for causing the computer to determine whether to transmit the TSP parameter or the updated TSP parameter based on a comparison of the value of a difference between the updated TSP parameter and the TSP parameter to a predetermined threshold value; and
   code for causing the computer to transmit the updated TSP parameter to the first terminal based at least in part on the determination that the difference value is greater than the predetermined threshold value.

15. The computer program product of claim 14, wherein the user device category information is received on an uplink signal channel.

16. The computer program product of claim 14, wherein the TSP parameter is transmitted on a downlink signaling channel.

17. A method for adaptive packet retransmission, the method comprising:
   identifying a first Timer Status Prohibit (TSP) parameter at a first device;
   measuring a Round Trip Time (RTT) parameter between the first device and a second device;
   determining, based on the RTT parameter and on user device category information for the second device, a second TSP parameter different from the first TSP parameter;
   transmitting the second TSP parameter to the second device when the second TSP is greater than the first TSP by at least a predetermined threshold value;
   measuring a Round Trip Time (RTT) parameter from a data channel;
   determining an updated Timer Status Prohibit (TSP) parameter based on the RTT parameter;
   determining whether to transmit the updated TSP parameter based on a comparison of the value of a difference between the updated TSP parameter and the TSP parameter to a predetermined threshold value; and
   transmitting the updated TSP parameter to the first terminal based at least in part on the determination that the difference value is greater than the predetermined threshold value.

18. The method of claim 17, further comprising:
   utilizing the first TSP paramerter instead of the second TSP parameter when the second TSP parameter is not greater than the first TSP parameter by at least the predetermined threshold value.

19. An apparatus configured for adaptive packet retransmission, comprising:
   means for identifying a first Timer Status Prohibit (TSP) parameter at a first device;
   means for measuring a Round Trip Time (RTT) parameter between the first device and a second device;
   means for determining, based on the RTT parameter and on user device category information for the second device, a second TSP parameter different from the first TSP parameter;
   means for transmitting the second TSP parameter to the second device when the second TSP is greater than the first TSP by at least a predetermined threshold value;
   means for measuring a Round Trip Time (RTT) parameter from a data Channel;
   means for determining an updated TSP parameter based on the RTT parameter;
   means for determining whether to transmit the TSP parameter or the updated TSP parameter based on a comparison of the value of a difference between the updated TSP parameter and the TSP parameter to a predetermined threshold value; and
   means for transmitting the updated TSP parameter to the first terminal based at least in part on the determination that the difference value is greater than the predetermined threshold value.

20. The apparatus of claim 19, further comprising:
   means for utilizing the first TSP parameter instead of the second TSP parameter when the second TSP parameter is not greater than the first TSP parameter by at least the predetermined threshold value.

\* \* \* \* \*